United States Patent
Gedamu et al.

(10) Patent No.: US 12,359,829 B2
(45) Date of Patent: Jul. 15, 2025

(54) TREATMENT OF AIR STREAMS WITH ELECTROMAGNETIC REMOVAL OF VIRUSES AND CHARGED PATHOGENS

(71) Applicant: H3ALTH TECHNOLOGIES INC., Calgary (CA)

(72) Inventors: Elias Gedamu, Calgary (CA); Lashitew Gedamu, Calgary (CA); Rani Hussein, Calgary (CA); Chantelle Anderson, Calgary (CA); Abraham Gedamu, Calgary (CA)

(73) Assignee: H3ALTH TECHNOLOGIES INC., Calgary (CA)

( * ) Notice: Subject to any disclaimer, the term of this patent is extended or adjusted under 35 U.S.C. 154(b) by 984 days.

(21) Appl. No.: 17/354,111

(22) Filed: Jun. 22, 2021

(65) Prior Publication Data

US 2021/0396409 A1 Dec. 23, 2021

Related U.S. Application Data

(60) Provisional application No. 63/042,214, filed on Jun. 22, 2020.

(51) Int. Cl.
| | |
|---|---|
| *F24F 8/192* | (2021.01) |
| *A62B 7/10* | (2006.01) |
| *B64D 13/08* | (2006.01) |
| *F24F 8/108* | (2021.01) |
| *F24F 8/22* | (2021.01) |

(52) U.S. Cl.
CPC ............. *F24F 8/192* (2021.01); *A62B 7/10* (2013.01); *B64D 13/08* (2013.01); *F24F 8/108* (2021.01); *F24F 8/22* (2021.01)

(58) Field of Classification Search
None
See application file for complete search history.

(56) References Cited

U.S. PATENT DOCUMENTS

2012/0207647 A1\* 8/2012 Kim ..................... A61L 9/22
422/107

FOREIGN PATENT DOCUMENTS

| CN | 109331212 A | * | 2/2019 | ............. A61L 9/18 |
| CN | 210624761 U | * | 5/2020 | ............. F24F 11/58 |
| WO | 2020/071629 A1 | | 4/2020 | |

OTHER PUBLICATIONS

Cao et al. CN210624761U—translate document (Year: 2020).*
Huang et al. CN109331212A—translated document (Year: 2019).*

\* cited by examiner

*Primary Examiner* — Jelitza M Perez
(74) *Attorney, Agent, or Firm* — FULLER IP LAW LLC; Rodney J. Fuller

(57) ABSTRACT

The invention is directed to an electromagnetic air filtration system and process for removing charged pathogens, such as, the SARS-CoV-2 virus, from an air stream. The air filtration system and process provide a magnetic field within an airflow to remove charged pathogens from the airflow, thereby producing treated air.

20 Claims, 18 Drawing Sheets

Method to inactivate
Air flow conduit is coated with a special coating that inactivates pathogens

Conceptually barrier to entry line caused by interaction between the magnetic field and charged particle in motion

AIR FLOW INTAKE

UV

Method to inactivate
Ultraviolet light is applied to inactivate the pathogens

Method to inactivate
Target the Larmor or precessional frequency of the pathogens using a secondary electromagnetic field sequence and exploit the specific absorption rate to heat and inactivate the pathogens

Method to inactivate
Heat is applied to inactivate the pathogens

FIG. 1

TREATMENT OF AIR STREAMS WITH ELECTROMAGNETIC REMOVAL OF VIRUSES AND CHARGED PATHOGENS

CROSS-REFERENCE TO RELATED APPLICATIONS

This application claims the benefit of and priority to U.S. Provisional Patent Application No. 63/042,214, filed Jun. 22, 2020, the contents of which are hereby incorporated by reference in its entirety.

TECHNICAL FIELD

The technical field generally relates to the filtration of pathogens, such as viruses, from air. The technical field more particularly relates to the treatment of air streams for the removal of viruses, e.g., coronaviruses, and other charged pathogens using electromagnetic methods.

BACKGROUND

Systems that remove pathogens from fluids, such as water or air, are often based on mechanical filtration. Air filtration used in the context of respirators, for example, often uses fabrics having a weave and openness that prevents passage of pathogens while allowing air to pass. However, there are a number of drawbacks with fabric based removal systems and there is a need for enhanced technologies for removing pathogens, especially viruses that can be transmitted through the air.

SUMMARY

In some implementations, there is provided an electromagnetic air filtration system for removing SARS-CoV-2 virus from an air stream, comprising an air conduit having an inlet, an intermediate section and an outlet, the inlet being configured to receive a contaminated air stream; a solenoid positioned with respect to the air conduit to provide a magnetic field in at least the intermediate section of the air conduit; and a power source coupled to the solenoid to provide a current therethrough to generate the magnetic field for preventing passage of the SARS-CoV-2 virus in the air stream, thereby producing a treated air that is released via the outlet of the air conduit.

In some implementations, the air conduit is part of an HVAC assembly. The HVAC assembly can be part of a residential, industrial or commercial building, e.g., a hospital building. In some implementations, the air conduit is part of an airplane air circulation assembly. The air conduit can be part of a respirator assembly. In some implementations, the air conduit is part of an automobile air circulation assembly. In some implementations, the air conduit is part of a biohazard containment assembly.

In some implementations, the air conduit is cylindrical. In some implementations, the air conduit has a rectangular cross-section. In some implementations, the air conduit has a polygonal cross-section. In some implementations, the air conduit has a toroidal configuration. In some implementations, the air conduit is flexible or rigid or a combination thereof in different sections. In some implementations, the air conduit is composed of metal or plastic or rubber or a combination thereof in different sections.

In some implementations, the solenoid comprises at least one coiled cable component and two connector components extending from opposed ends of the corresponding coiled cable component. In some implementations, the solenoid comprises one coiled cable component located around or defining at least a portion of the intermediate section. In some implementations, the solenoid comprises multiple coiled cable components located around at least a portion of the intermediate section in spaced apart relation to each other. In some implementations, the solenoid is formed by a single metallic coiled cable. In some implementations, the coiled cable comprises a conductive metallic wire and a non-conductive sheath around the metallic wire. In some implementations, the metallic wire is composed of copper. In some implementations, a plurality of solenoids is provided, which can be arranged into various configurations. For example, the plurality of solenoids may be arranged in series, or adjacent to one another, or a combination thereof. More complex or ordered structures can be used, such as a honeycomb configuration.

In some implementations, the intermediate section is defined by a wall around which the solenoid is wound. In some implementations, the intermediate section is defined by an inner surface of the solenoid that defines an air core. In some implementations, the intermediate section is sized to provide the air stream with a flow rate and air velocity for an HVAC system, a respirator assembly, a biohazard containment assembly, or an airplane air circulation system.

In some implementations, the power source comprises a battery, a solar powered assembly comprising a battery, a direct current source, an alternating current source, or a fuel-powered generator, or a combination thereof.

In some implementations, the solenoid and the power supply are arranged and operated such that the electromagnetic field has a negative end toward the inlet and a positive end toward the outlet of the air conduit.

In some implementations, the system further comprises a deactivation component coupled to or proximate the air conduit to deactivate the SARS-CoV-2 virus. The deactivation component can include a coating on an interior surface of the air conduit for direct contact with the SARS-CoV-2 virus. In some implementations, the deactivation component comprises a UV treatment unit, a heating unit, or a combination thereof.

In some implementations, the solenoid is positioned in-line and axially with respect to the air conduit such that the air stream flows therethrough. In some implementations, the solenoid is at an angle with respect to the air stream flowing through the air conduit. In some implementations, the solenoid comprises two opposed open ends, at least one of which receiving the air stream via the inlet, and the solenoid further comprises a side opening that communicates with the outlet of the air conduit and causes the air stream to flow out along a different direction compared to the air stream flowing into the solenoid.

In some implementations, the system comprises a flow deflection assembly for causing the flow of the air stream entering via the inlet to change direction such that the magnetic field acts on the SARS-CoV-2 virus flowing with the air stream.

In some implementations, there is provided an electromagnetic air filtration system for removing microscopic charged pathogens from an air stream, comprising an air conduit having an inlet, an intermediate section and an outlet, the inlet being configured to receive a contaminated air stream; and an electromagnet arranged with respect to the intermediate section of the air conduit and configured to generate a magnetic field within the intermediate section of the air conduit for removing microscopic charged pathogens from the air stream, thereby producing a treated air that is released via the outlet of the air conduit.

In some implementations, the electromagnet comprises a solenoid. The solenoid can be arranged around at least a portion of the intermediate section of the air conduit and such that the solenoid is configured to generate a magnetic field that establishes a pathogen-repelling zone toward the inlet and a pathogen-attracting zone toward the outlet of the air conduit.

In some implementations, the electromagnet is configured such that the magnetic field removes viruses as the microscopic charged pathogens, and the viruses can be or include SARS-CoV-2 virus.

In some implementations, the system further comprises a fabric filter component mounted in the air conduit. In some implementations, the system further comprises a fabric filter component mounted in the intermediate section of the air conduit within an air core defined by the solenoid. The fabric component can have various properties and can be mounted in various ways to collect particles, which may include magnetically deflected viruses.

In some implementations, there is provided a process for electromagnetically filtering an air stream to remove SARS-CoV-2 virus, comprising feeding the air stream through an air conduit; generating an electromagnetic field within the air conduit, wherein the electromagnetic field deflects the SARS-CoV-2 virus entrained by the flow of the air stream in the air conduit, thereby removing the SARS-CoV-2 virus from the air and producing a treated air stream; and releasing the treated air stream.

In some implementations, the electromagnetic field is provided by a solenoid that is coiled around a section of the air conduit. In some implementations, the electromagnetic field is a magnetic field. The process can also include steps and can be implemented using various devices, some of which are described herein.

In some implementations, there is provided a use of a solenoid and/or magnetic field generator to remove charged pathogens, such as the SARS-CoV-2 virus, from an air stream.

In some implementations, there is provided a process for electromagnetically filtering an air stream to remove charged pathogens, comprising feeding the air stream through an air conduit; generating an electromagnetic field within the air conduit, wherein the electromagnetic field deflects the charged pathogens entrained by the flow of the air stream in the air conduit, thereby removing the charged pathogens from the air and producing a treated air stream; and releasing the treated air stream.

In some implementations, the electromagnetic field is provided based on water vapour in the air stream. The magnetic field can be provided for preventing passage of all SARS-CoV-2 virus contained in the air stream.

It is also noted that the processes or systems described herein can be used in combination with other components and/or techniques described herein.

BRIEF DESCRIPTION OF DRAWINGS

The figures represent various features, aspects and implementations of the technology described herein. It is noted that the embodiments and concepts shown in the figures should not be viewed as limiting the scope of the innovative aspects of this technology.

FIG. 1 is a side view of a pathogen removal system.

DETAILED DESCRIPTION

Bacterial and viral pathogens, such as coronaviruses, can be removed from air streams by leveraging electromagnetic forces. A magnetic field can be generated to aid filtering of viral pathogens entrained in an air flow. The magnetic field can be generated in various ways for implementation in an electromagnetic filtration system. For instance, the electromagnetic filtration system can include a solenoid that is arranged along a section of an air conduit that receives a contaminated air stream and is coupled to a power source to provide current therethrough to generate a magnetic field within or in the vicinity of the air conduit to remove negatively or positively charged pathogens, including coronaviruses such as SARS-CoV-2. The charged pathogens are repelled following the interaction effects of a moving particle through a magnetic field. The air stream passing through the air conduit section is thus treated by electromagnetic filtering. The electromagnetic filtration system thus produces a treated air stream depleted in pathogens. The solenoid and its power source can be configured to cooperate with air conduits of various shapes, sizes and orientations and that are part of various systems, such as HVAC systems for residential, industrial or commercial buildings; airplane air circulation systems; portable or stationary respirator systems; containment systems; and so on.

In some implementations, the electromagnetic filtration system removes negatively charged pathogens, such as viruses and other pathogens. DNA and RNA molecules are negatively charged and this electromagnetic property of the polynucleotide molecules can be leveraged to control movement of the pathogens. For example, the spatial configuration of the magnetic field generated by the solenoid can create a pathogen-repelling zone at or near one end of the solenoid that can repel RNA molecules, such as those in SARS-CoV-2, and a pathogen-attracting zone at or near the other end of the solenoid that can attract RNA molecules. Accordingly, the solenoid can be oriented such that the pathogen-repelling zone is positioned facing the upstream end of the air conduit toward the inlet, and the pathogen-attracting zone is positioned toward the outlet. The magnetic field in the pathogen-repelling zone can thus produce a repelling magnetic force on the pathogens entrained in the air stream flowing in the downstream direction, thus preventing the pathogens from remaining in the air that is expelled from the outlet. In addition, in some applications, such as respirators, negatively charged pathogens that may be present on the downstream side can also be attracted by the magnetic force generated by the magnetic field in the pathogen-attracting zone, thus retaining the pathogens in the filtration section rather than being expelled into the environment.

Figure 2:
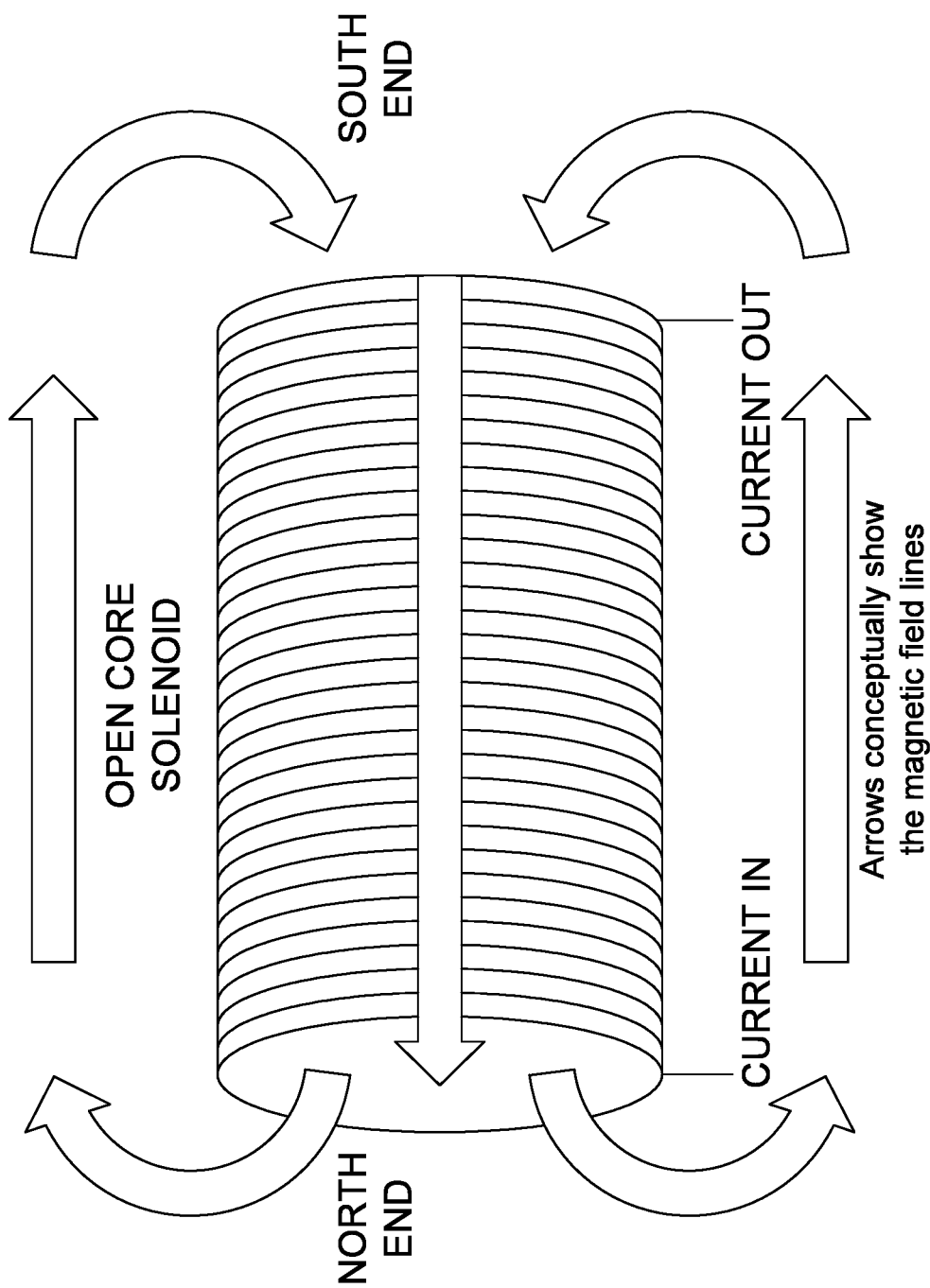
FIG. 2 is another side view of a pathogen removal system.
Figure 3:
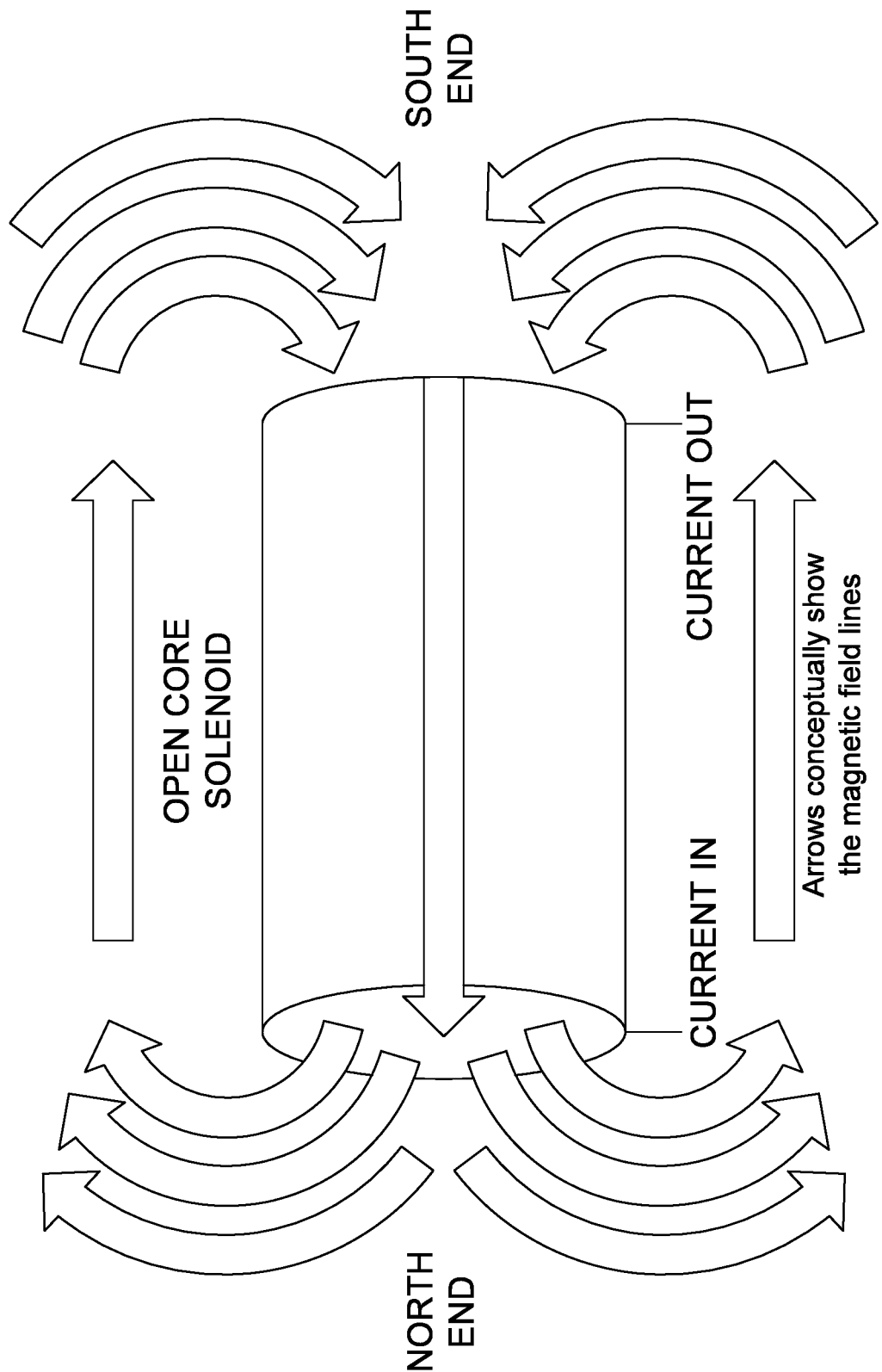
FIG. 3 is another side view of a pathogen removal system.

In terms of the magnetic field effect on the flow of electrically charged pathogens, the magnetic field for an open solenoid is illustrated in the FIGS. 2 and 3. FIG. 2 shows the coils of the solenoid as well as the input and output current. As current flows through the solenoid coil, a magnetic field is created. Inside the solenoid core, the magnetic field is generally uniform and parallel to the length of the solenoid. At the north and south pole of the solenoid, the magnetic field is distorted and maps a trajectory between the north and south poles (see FIG. 3). These distorted paths are curved and are not parallel to the length of the solenoid coil. These magnetic field properties can be leveraged to filter out incoming electrically charged pathogens in air flow systems by repelling/deflecting the pathogen.

Figure 17:
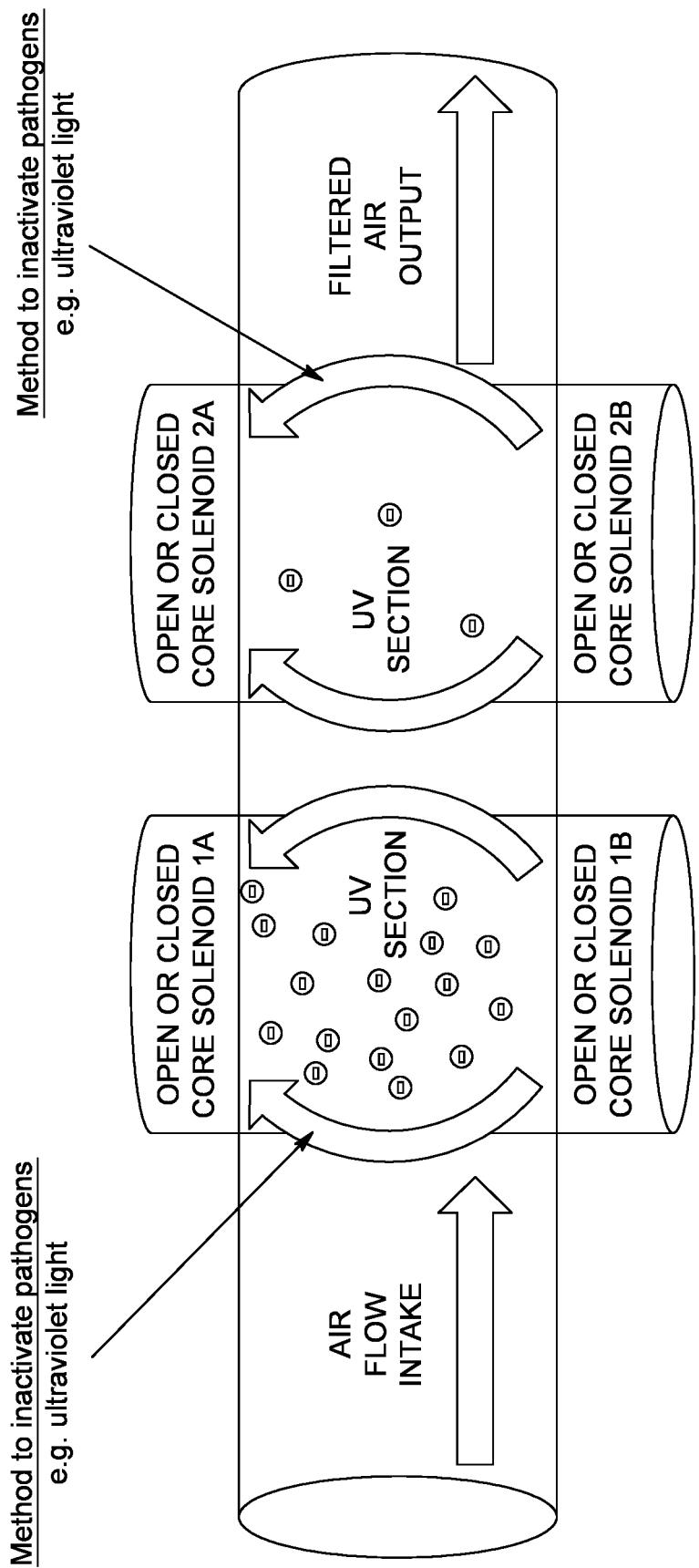
FIG. 17 is yet another view of a pathogen removal system.
Figure 18:
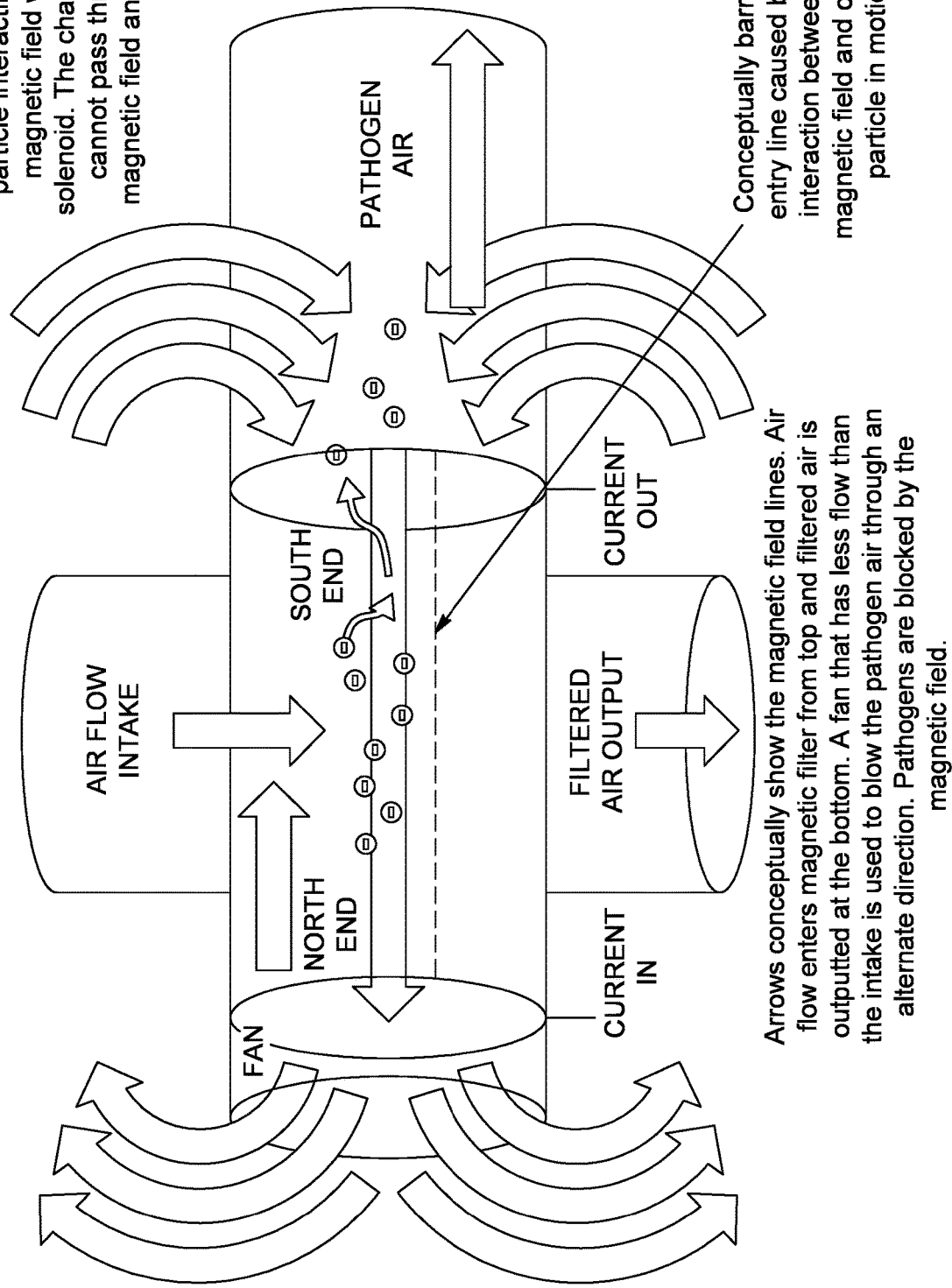
FIG. 18 is a further view of a pathogen removal system.

According to the Lorentz force, an electrically charged particle that flows into a magnetic field will have an interaction effect if the trajectory of the electrically charged particle is not parallel to the magnetic field. This implies that an electrically charged particle that flows toward a magnetic field and at an angle to said magnetic field will experience a change in trajectory. The change will be 90 degrees away from the direction of the magnetic field and the trajectory of the electrically charged particle. Accordingly, at the edge of the solenoid where the magnetic field is distorted and curves toward the opposing pole, an interaction effect with incoming electrically charged particles is expected (see FIG. 4). Should the core of the solenoid or area between two solenoid cores in series be used to filter pathogens (e.g., see FIGS. 17 and 18), the relatively straight uniform magnetic fields would interact with the incoming charged particles. Depending on the design, both the edge of the solenoid and core can be used to filter pathogens.

Figure 4:
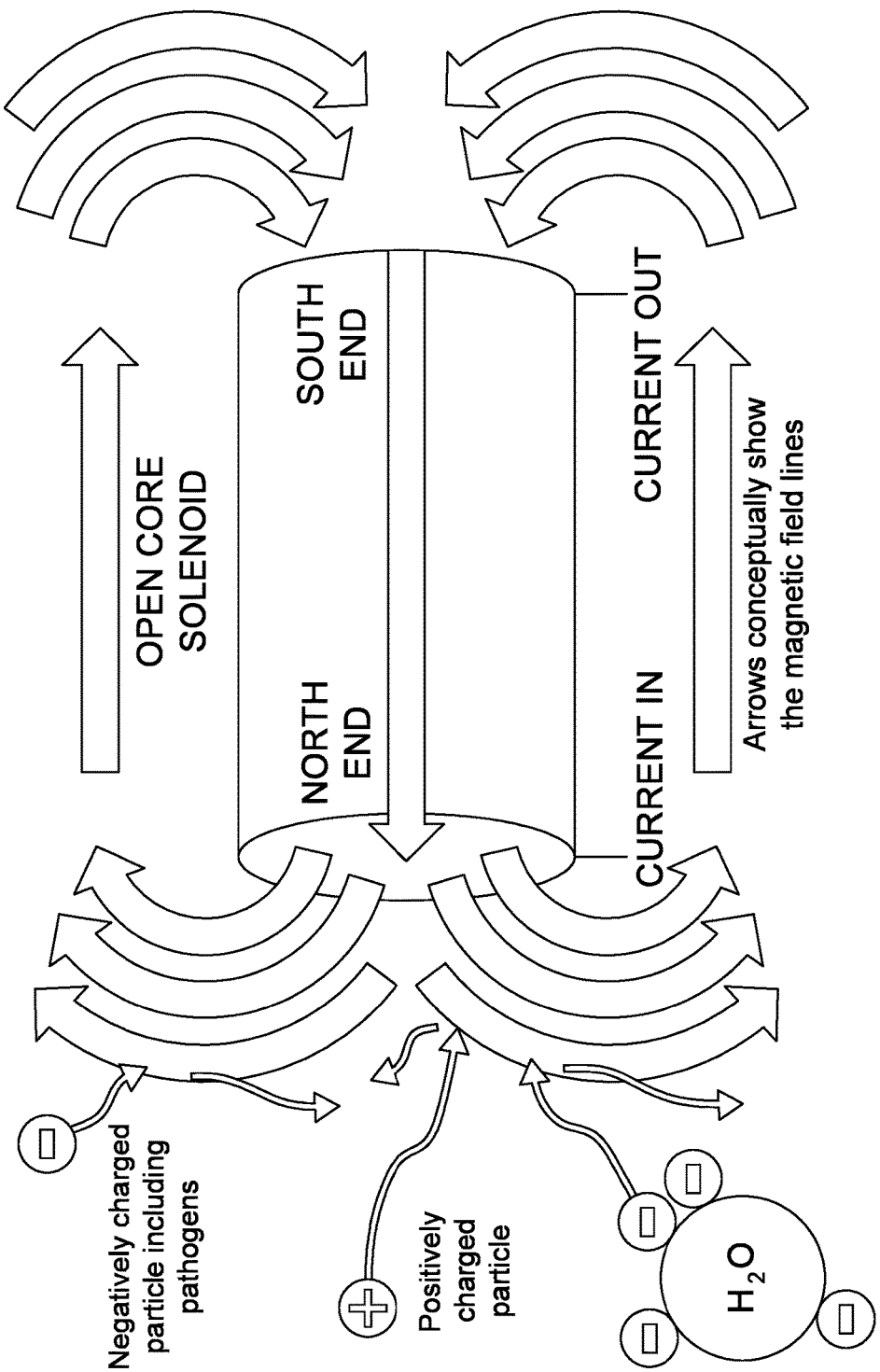
FIG. 4 is another side view of a pathogen removal system.

In addition, electrically charged pathogens, like SARS-CoV-2, can bind to water vapour as a method of airborne transportation. This is illustrated in FIG. 4. The field strength and power inputs in the solenoid can be adapted based on properties of the air stream, such as the particles or droplets to which the pathogens are bound in the air stream. For instance, the field strength can be adapted or controlled based on the humidity of the air stream as an indicator of the state of the pathogens in water vapour in the air stream. The humidity and/or other properties of the air stream can be measured, and the data can be fed into a control system that controls the strength of the magnetic field.

Figure 5:
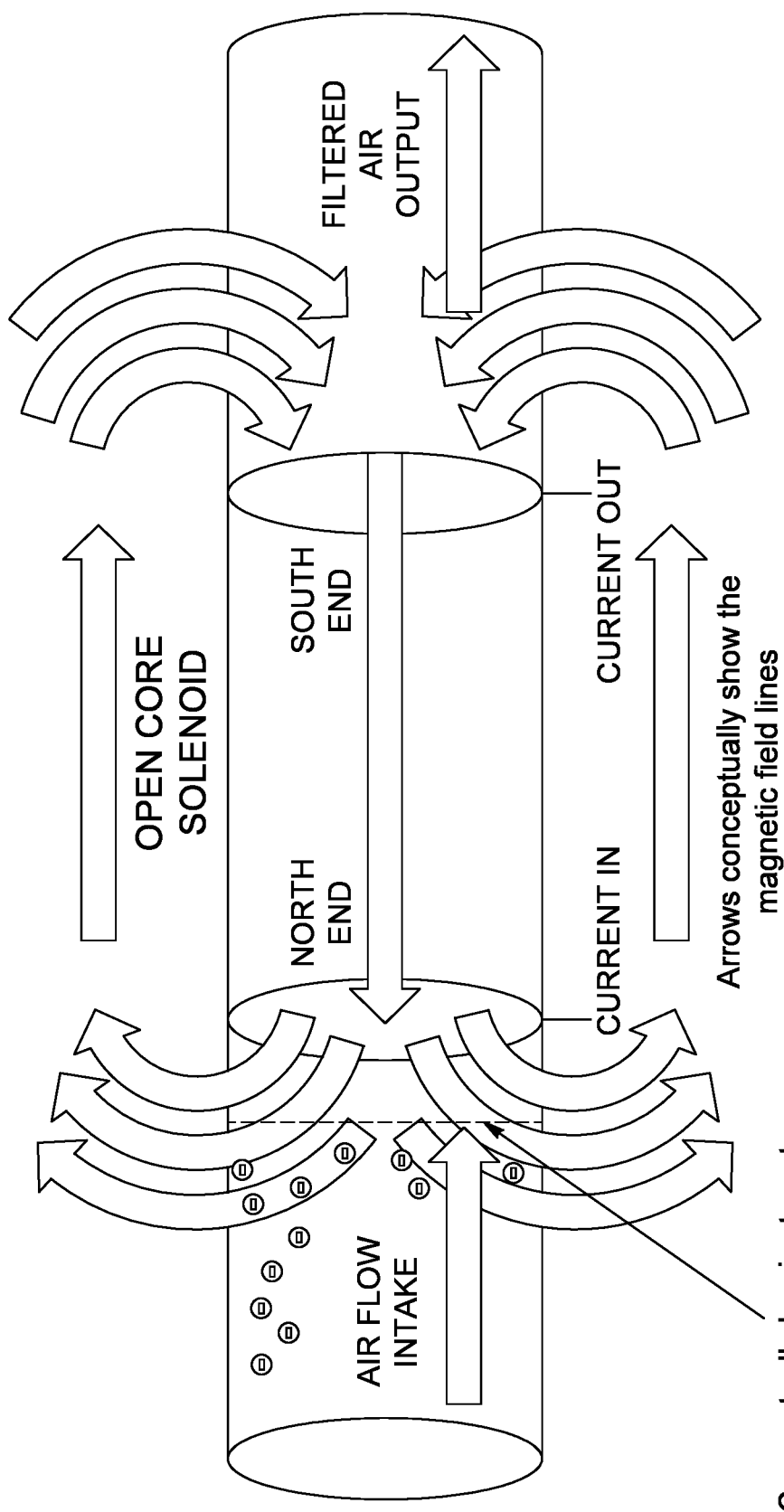
FIG. 5 is another side view of a pathogen removal system.

The magnetic field filter can be applied in various air flow applications. FIG. 5 shows an example of an open core solenoid-based magnetic field filter. Air flow is channeled through an intake vent toward the magnetic filter where pathogens are filtered and unable to proceed further. Filtered air passes through the vent system toward the output. To inactivate pathogens, the methods illustrated in FIG. 1 can be used. Alternatively, after a period of time the pathogens would inactivate without a host. In the illustration of FIG. 5, the solenoid is aligned in parallel with the air flow but, as described earlier, the solenoid could be aligned perpendicularly or at another orientation with respect to the air flow for some applications. A plurality of solenoid filters could be used in series, in an adjacent formation, staggered, or any combination thereof.

The electromagnetic filtration system can target the electromagnetic properties of pathogens, such as SARS-CoV-2 and similar RNA-based viruses, to prevent transmission. More specifically, in one implementation, the filtration system is provided as part of a respirator that uses magnetic fields as a filtering mechanism. In this application, the filtration system targets an electromagnetic property of the virus, that is, its electric charge, rather than filtering based on the size of a particulate or virus. As the demand on sourcing finished respirators or fabrics for local production increases and availability decreases, alternative filtering mechanisms may increase in importance.

This electromagnetic filtration system can provide a number of advantages compared to fabric based filtration. Certain fabric-based solutions have drawbacks, such as issues with robustness and accuracy of the weave, complex machinery for manufacturing, environmental impact, and limitations when it comes to viral filtration. Embodiments of electromagnetic filtration systems can provide both repelling and attracting functionality, which can be desired in certain air flow scenarios; simple manufacturing; availability of materials for fabrication; among others. Implementations of the electromagnetic filtration system can be used in the context of personal protective equipment (PPE) for protecting citizens against SARS-CoV-2 and other pathogens.

By way of context, there are multiple well documented methods for creating a positively charged or magnetized field for the purpose of filtering including magnets, non-uniform field like dielectrophoresis, and capacitive plates. For the present technology, various methods can be used, with a preferred technique being the use of an air hole solenoid for filtering. The use of the solenoid has a number of notable advantages: relatively easy to customize the magnetic field strength; relatively simple to achieve a uniform magnetic field; air hole solenoids are relatively easy to manufacture; manufacturing can be done using materials available in certain jurisdictions (e.g., Canadian materials); air flow is relatively unencumbered; physical attributes facilitate fastening to existing respirators or other air flow systems.

The general principles of a magnetic field that is generated by a solenoid are briefly described hereafter. A solenoid is a coil of conductive material and when current flows through the coil, a magnetic field is generated based on the current, area of the air core, length of solenoid, and number of turns in the solenoid coil. Both straight and curved solenoids can be used. Depending on the application, the solenoid can be driven by DC or AC currents. Optimizing these parameters to the pathogen's molecular properties of interest produces a magnetic field that filters RNA-based viruses like SARS-CoV-2.

The solenoid component requires a conductive material, such as copper, and a power source to function. Conductive materials and rechargeable batteries are produced in various jurisdictions, such as Canada, which can facilitate local production. The power requirements to provide a full day of protection will be minimal as the magnetic field strength requirement should be low for filtration given the low molecular weight and electromagnetic characteristics of SARS-CoV-2 and similar RNA-based viruses. The magnetic field strength requirement should also be low for pathogens that are attached to water vapor.

It is noted that the electromagnetic filtration system can be implemented in various different air flow contexts, including HVAC systems, respirators, containment systems, and air circulation systems in airplanes. The following sections provide additional details regarding the potential applications of the electromagnetic filtration system.

Respirator Implementations

In one implementation, the respirator includes an integrated air core solenoid as a mechanism for filtering SARS-CoV-2 and similar RNA-based viruses. The pathogen-repelling zone of the solenoid is arranged furthest away from the mouth (i.e., closer to the air inlet) and the pathogen-attracting zone closest to the mouth. This arrangement can effectively repel RNA viruses present in the natural environment from entering the lungs during inhalation (i.e., RNA viruses will be filtered by the solenoid) and prevent RNA viruses from leaving the lungs to enter the atmosphere during exhalation (i.e., RNA viruses will be bound to the solenoid and can be eliminated through sterilization). The solenoid could be sterilized using ethanol or soap and water. The solenoid could be removed, which would be facilitated for a respirator design that is modularized into components.

The respirator can be configured to provide a complete seal with the face, thereby preventing any air flow from entering the body between the skin and the respirator (skin-respirator interface) and directs air flow through the filter orifice. The respirator has been designed with a single air flow entryway for breathing. The electromagnetic filtering mechanism can be attached to the entryway (i.e., the design matches the respirator requirements). The electromagnetic filtration system can be designed to be insertable into a filter slot of a respirator to facilitate manufacturing and high-volume production.

Figure 6:
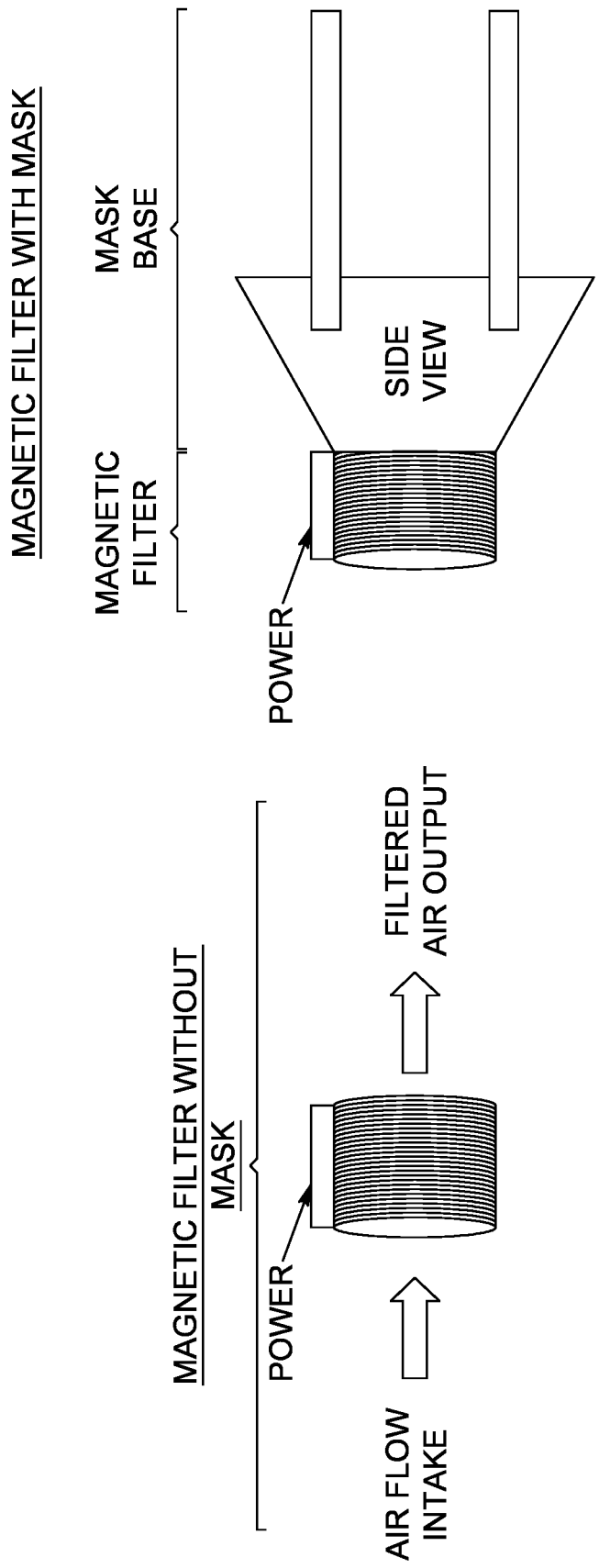
FIG. 6A is a side view of pathogen removal systems used without a mask.
FIG. 6B is a side view of pathogen removal systems used with a mask.
Figure 7:
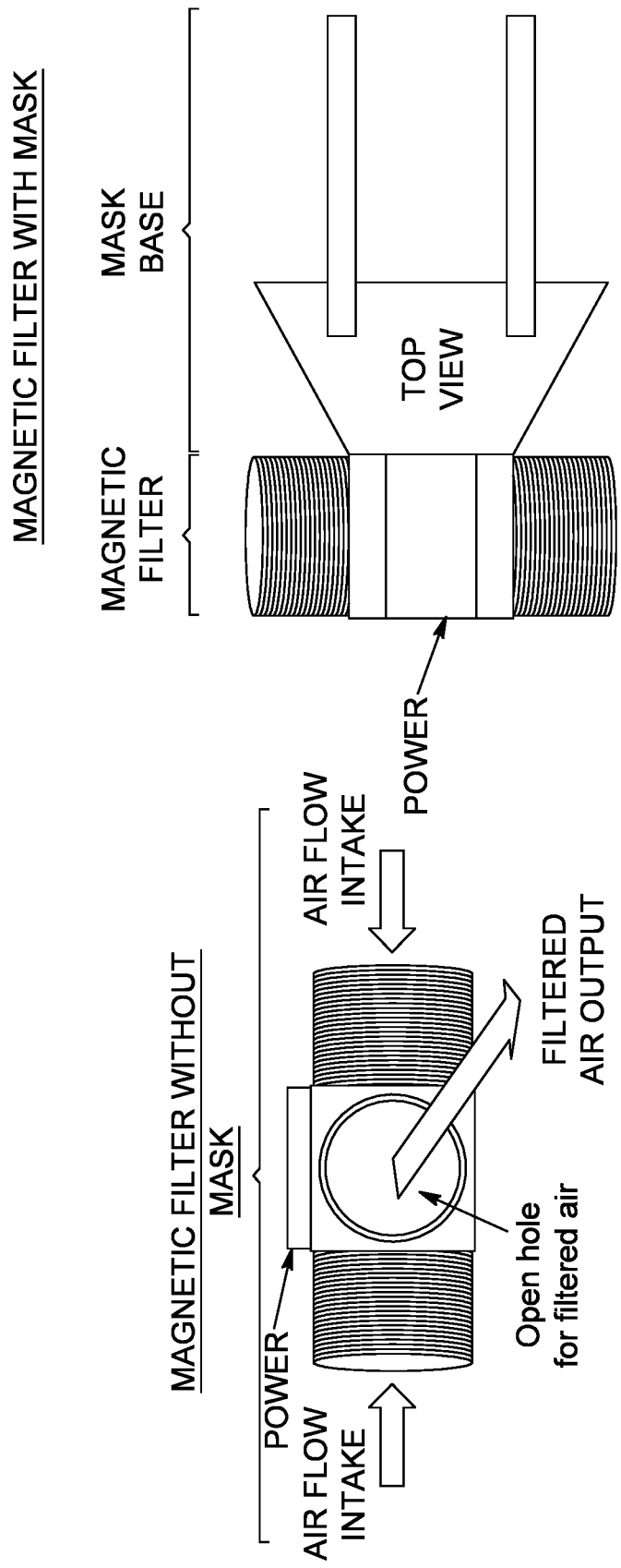
FIG. 7A is another side view of pathogen removal systems used without a mask.
FIG. 7B is another side view of pathogen removal systems used with a mask.

FIGS. 6 and 7 show two possible configurations for mounting and powering the magnetic filter with a mask. However, such configurations are not limited to mask applications and similar mounting and powering methods could be used for HVAC, airplane recirculation, and containment systems. FIG. 6 has the solenoid mounted in-line with the mask. The air flow would enter through the opening of the solenoid in front of the mask with filtered air flowing toward the opposite end of the solenoid. A battery could be mounted to the top of the solenoid as a power source. FIG. 7 illustrates the solenoid magnetic filter mounted perpendicular to the mask with air flow entering/exiting from the two ends of the solenoid. The solenoid has an opening in the center that mounts to the mask and allows filtered air to flow out. A battery could be mounted to the top of the solenoid as a power source. It is appreciated that configurations where the solenoid axis is neither parallel nor perpendicular to the air flow can be envisioned in other implementations.

It is noted that the electromagnetic filtration system could be used with various types and designs of respirators. The electromagnetic filtration system can for example be used with a respirator that is re-usable and easily sterilizable (e.g., respirators can be sterilized after use with cleansers that inactivate the SARS-CoV-2 virus without degradation in effectiveness). The respirator can provide a complete seal with the face, whereas most fabric-base respirators do not seal properly which can compromise the efficacy of the respirator. Air flows through the path of least resistance and, if the skin-respirator interface is compromised, air can circumvent the filtering fabric and directly enter the lungs. This is a weakness of fabric-based respirators. One embodiment of the respirator has been designed with a single air flow entryway for breathing. The entryway is agnostic to various filter types (e.g., filter fabrics, modules, etc., can be used by simply fastening to the respirator). The solenoid component can simply be fastened to the respirator, and can be designed for insertion into a filter compartment of the respirator. The manufacturing of the electromagnetic filtration system can also match the re-usability specifications of existing respirators. Accordingly, electromagnetic filtration system can be provided as a separate component that can be integrated into certain respirators for which the system can be designed.

In some implementations, the electromagnetic filtration system can be used at least twice without loss of efficiency, for example through washing or sterilization. The respirators can be re-usable and easily sterilizable. The respirator can be made using medical grade polymers that are resistant to harsh chemicals. The respirators can be sterilized after use with cleansers or a sterilization process that inactivates the SARS-CoV-2 virus without degradation in effectiveness. Washing and sterilization can occur more than twice without loss of efficiency. The electromagnetic filtration system is capable of deactivating viruses while being non-toxic to human health.

Airplane Air Circulation Implementations

Figure 8:
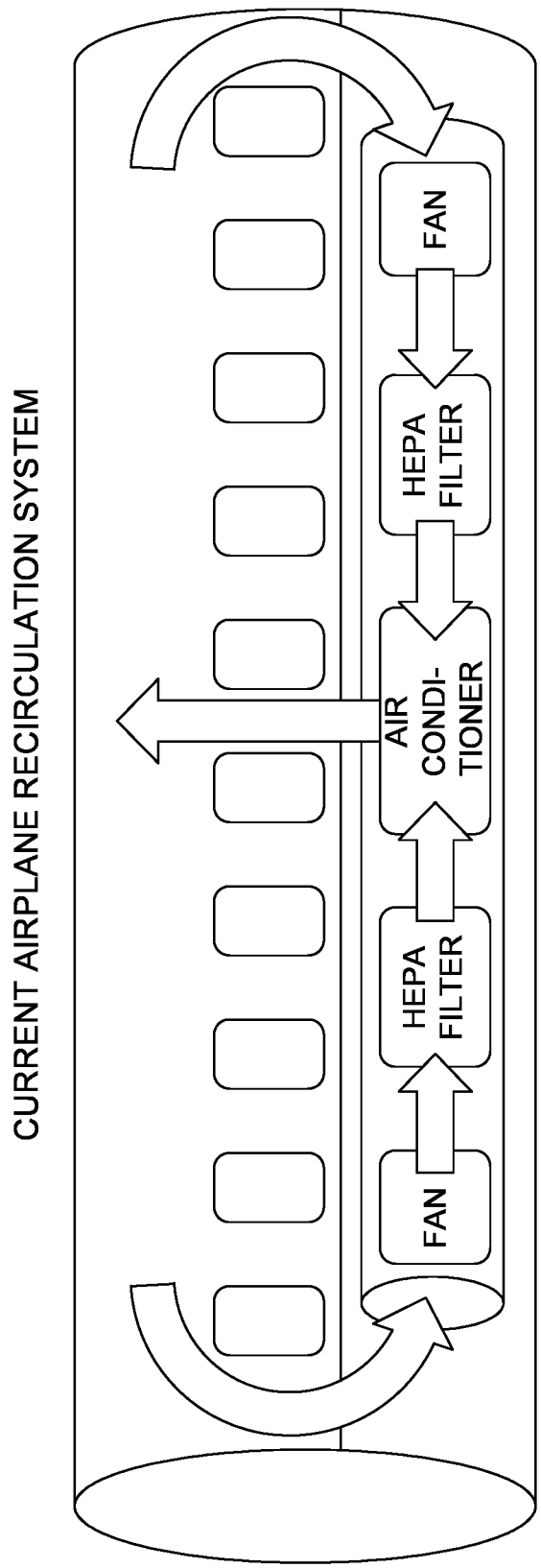
FIG. 8 is a view of a pathogen removal system implemented in an airplane.
Figure 9:
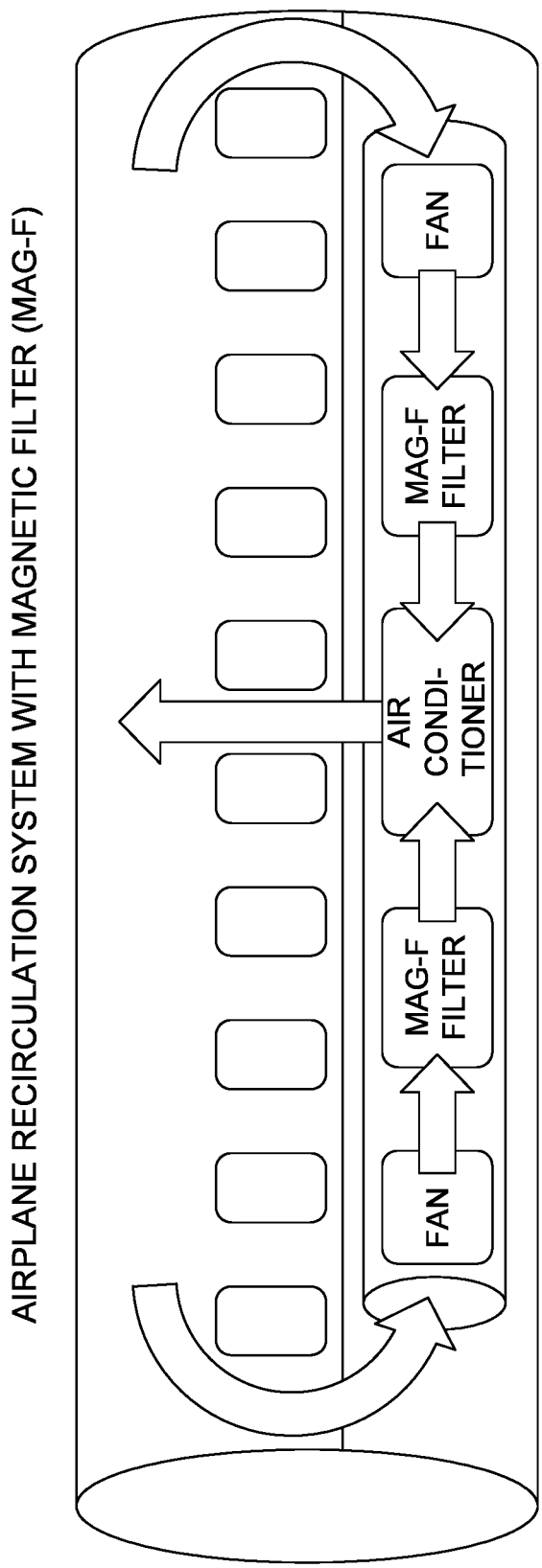
FIG. 9 is another view of a pathogen removal system implemented in an airplane.
Figure 10:
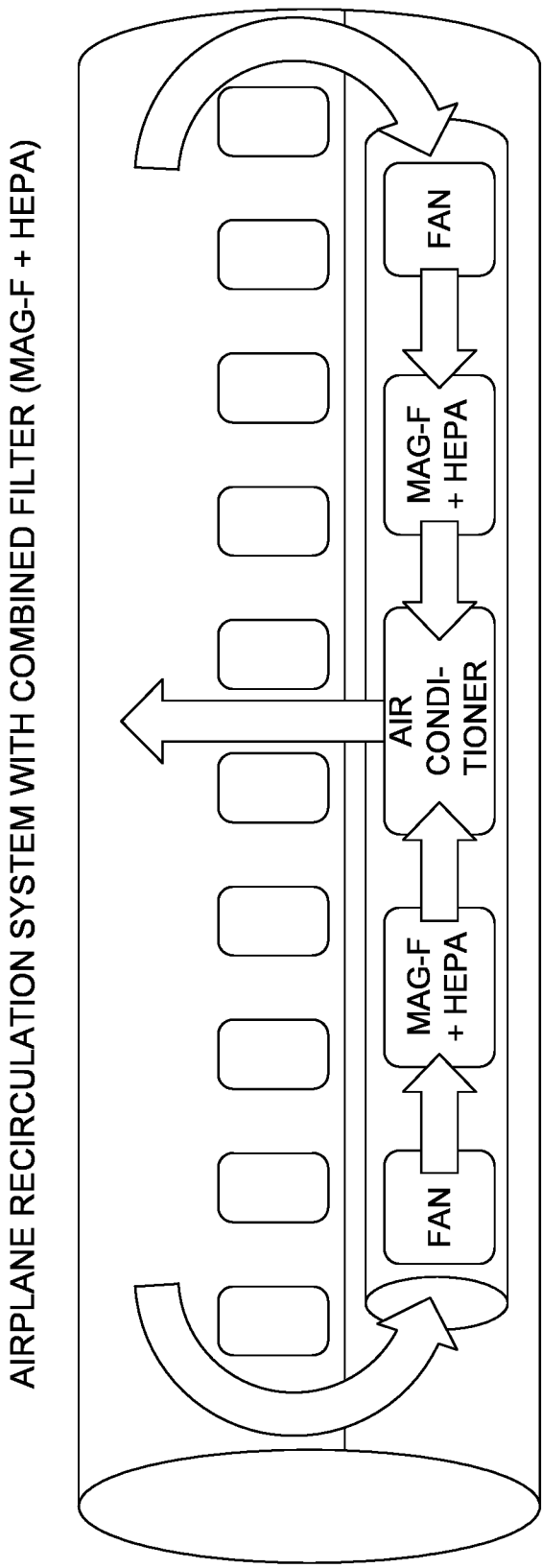
FIG. 10 is yet another view of a pathogen removal system implemented in an airplane.

FIGS. 8 to 10 show various components in an example arrangement for implementing the electromagnetic filtration system in an airplane air circulation system. Airplanes are equipped with circulation systems for circulating air and, generally, about 50% of the air is recirculated in an airplane. Each cabin is equipped with a circulation system that purifies air. The air is passed through a filter and if the filter is a high grade HEPA filter, it will capture 99.97% of fine particles (0.3 microns and larger). However, the diameter of certain viruses (e.g. the new coronavirus SARS-CoV-2) is reported as 0.1 microns ($\mu$m). One assumption is that the new coronavirus is a droplet infection where the droplet size could be 0.5 micron, but this assumption may not always be the case.

FIG. 8 shows an example of the current recirculation system in airplanes. Generally, air enters the airplane through conduits from the turbine engines where it passes through a HEPA filtering system and air conditioning prior to flowing through the venting system to the passengers. The magnetic filter could either replace or be combined with the HEPA filter system as shown in FIGS. 9 and 10. The magnetic filter could be integrated into the existing system to reduce the work required to implement the filter into existing systems like this and promote rapid adoption. In the case of combining the HEPA filter system with the magnetic filter, the solenoid system used for filtering could be designed to encapsulate the HEPA filter. For greater clarity, this would allow the HEPA filter to be embedded into the open core of the solenoid. It is noted that integrating the solenoid and HEPA filtration techniques can be done in various other applications, such as those described herein. The magnetic filter can facilitate preventing the recirculation of pathogens within the airplane. The power source for the magnetic filter could be the same as the that used for the air conditioning system of the airplane.

HVAC Implementations

Figure 11:
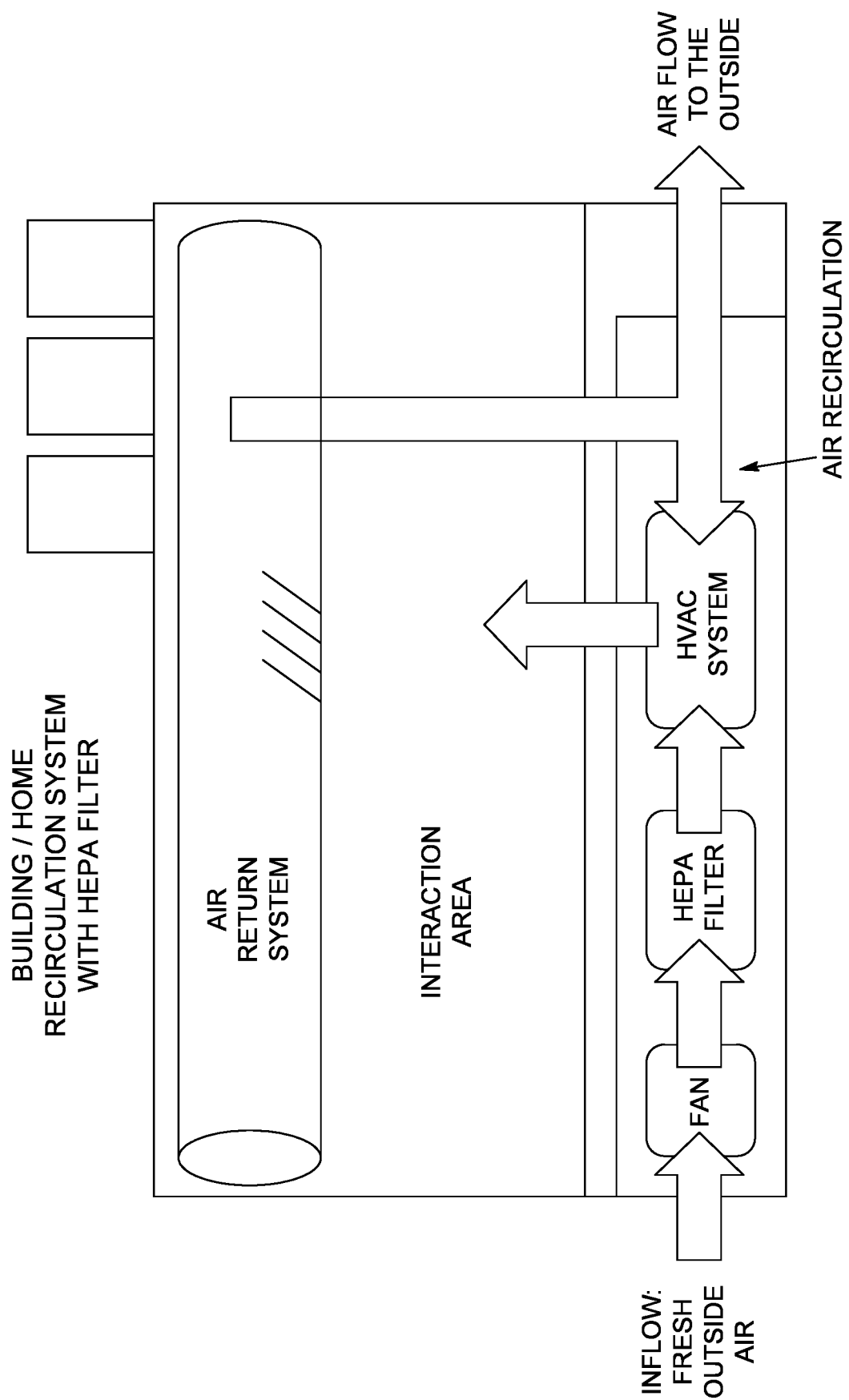
FIG. 11 is a view of a pathogen removal system implemented in a building.
Figure 12:
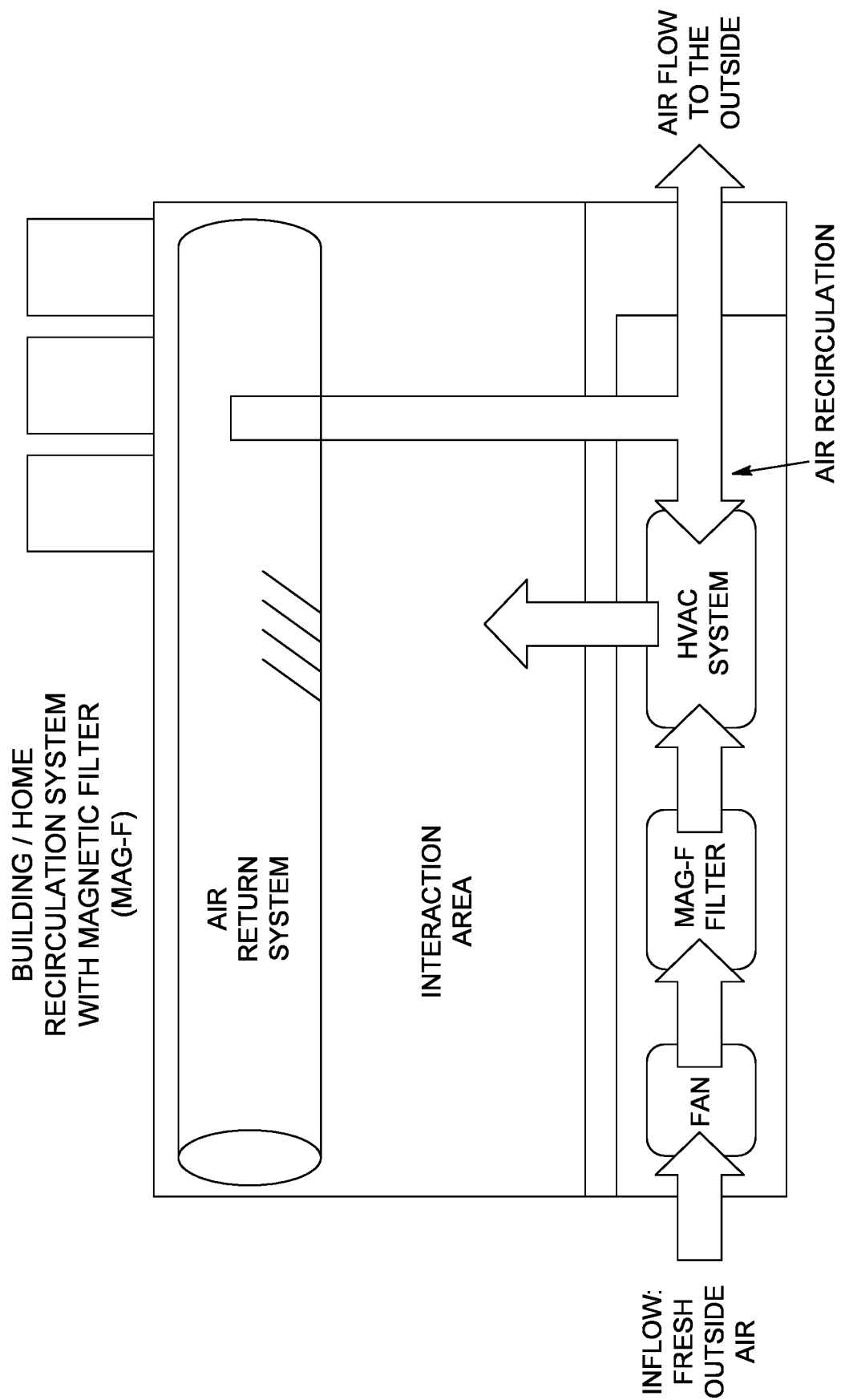
FIG. 12 is another view of a pathogen removal system implemented in a building.
Figure 13:
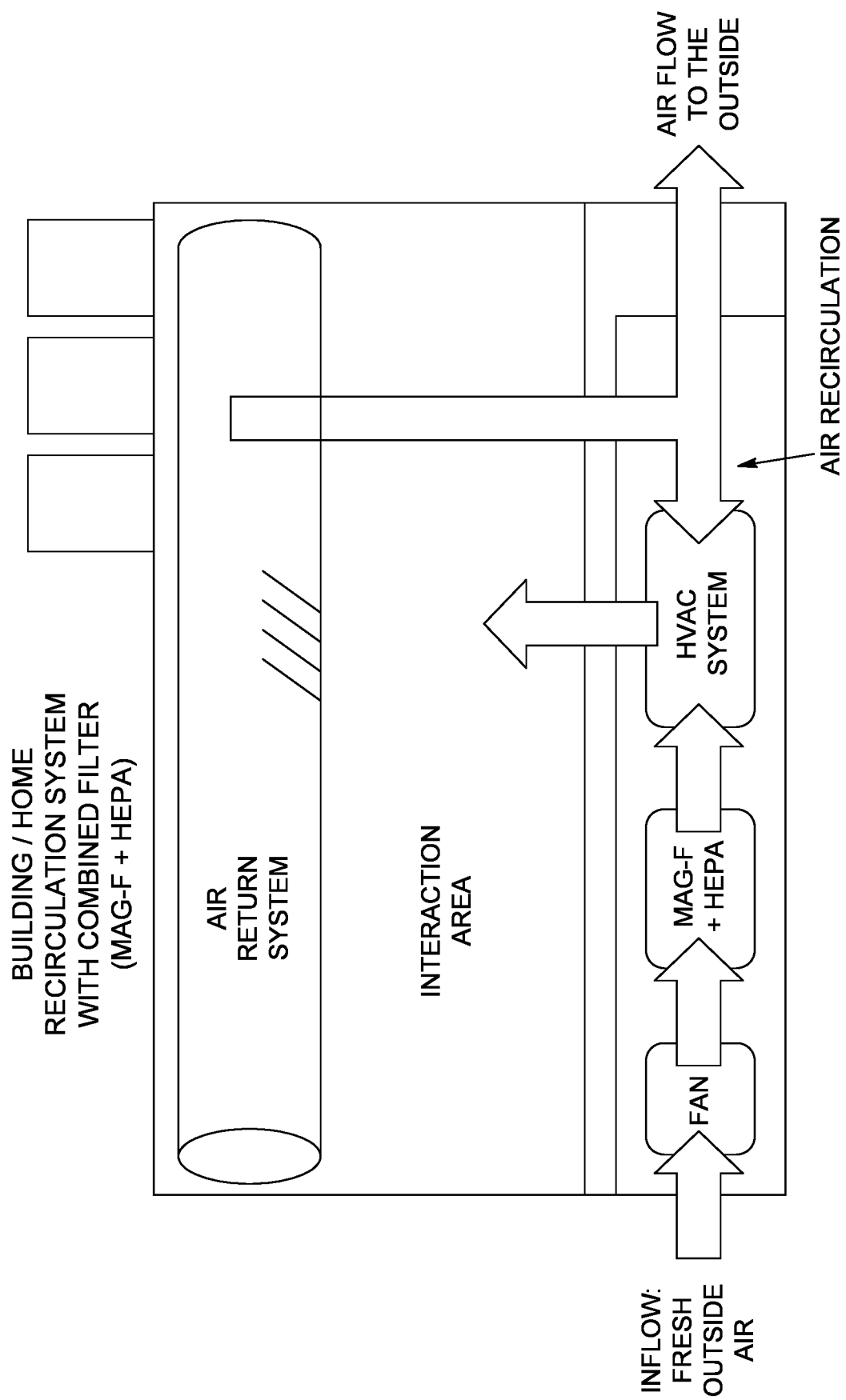
FIG. 13 is another view of a pathogen removal system implemented in a building.

FIGS. 11 to 13 show various components that are part of an example HVAC system. HVAC systems are the epicenter of air flow in buildings, including hospitals, as well as homes. HVAC systems generally operate using a percentage of fresh outdoor air and recirculated air. For example, a class P room in a hospital can use a 40/60 blend of recirculated air to fresh air ratio. Buildings and homes are equipped with a circulation system that have capabilities to recirculate air through a filtering system to purify the air. The air is passed through a filter and if the filter is a high grade HEPA filter, it will capture 99.97% of fine particles (0.3 microns and larger). However, the diameter of certain viruses (e.g. the new coronavirus SARS-CoV-2) is reported as 0.1 microns (μm). One assumption is that the new coronavirus is a droplet infection where the droplet size could be 0.5 micron, but this assumption may not always be the case.

FIG. 11 shows an example of a current recirculation system in a building. Generally, air enters the building from the outside through a fresh air intake (shown in the figures as 'INFLOW: FRESH AIR OUTSIDE') where the air passes through a HEPA filtering system and an HVAC system prior to flowing through the venting system into the common area of the building (show in the figures as 'INTERACTION AREA'). FIG. 11 shows the schematic for the air flow of a typical building. Note that HVAC System and filters are generally integrated. It is noted that the schematic is for illustrative purposes to provide a clear understanding of the concept. The magnetic filter could either replace or be combined with the HEPA filter system as shown in FIGS. 12 and 13. The magnetic filter could be integrated into the existing system to reduce the work required to implement the filter into existing systems like this and promote rapid adoption. In the case of combining the HEPA filter system with the magnetic filter, the solenoid system used for filtering could be designed to encapsulate the HEPA filter, e.g., where the HEPA filter is embedded into the open core of the solenoid. The magnetic filter would prevent the recirculation of pathogens within the building. The power source for the magnetic filter could be the same as the that used for the HVAC system, or it could be a separate dedicated power source for the electromagnetic filtration system (e.g., solenoid).

Containment System Implementations

Figure 14:
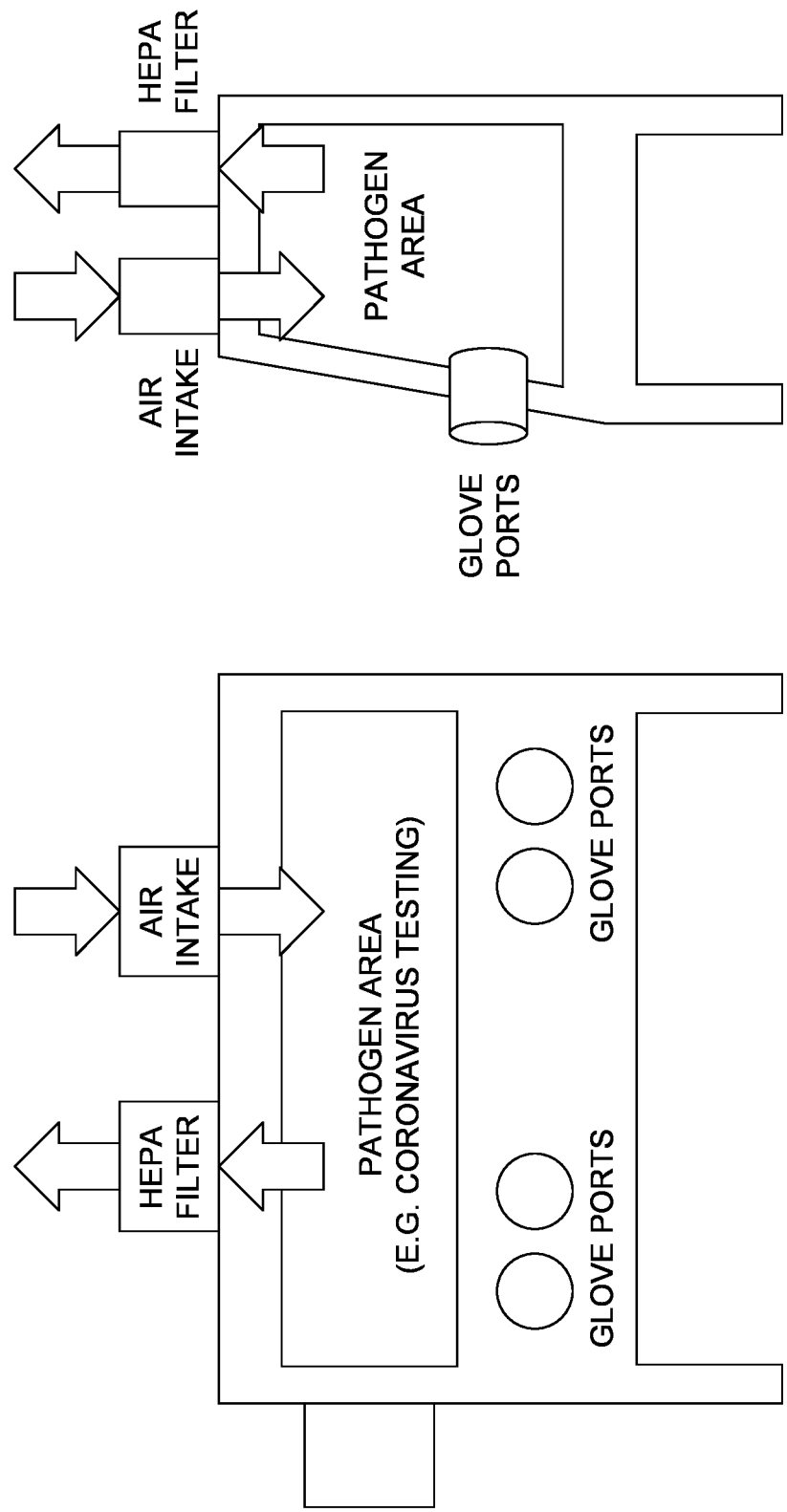
FIGS. 14A and 14B provide views of a pathogen removal system implemented in a containment system.
Figure 15:
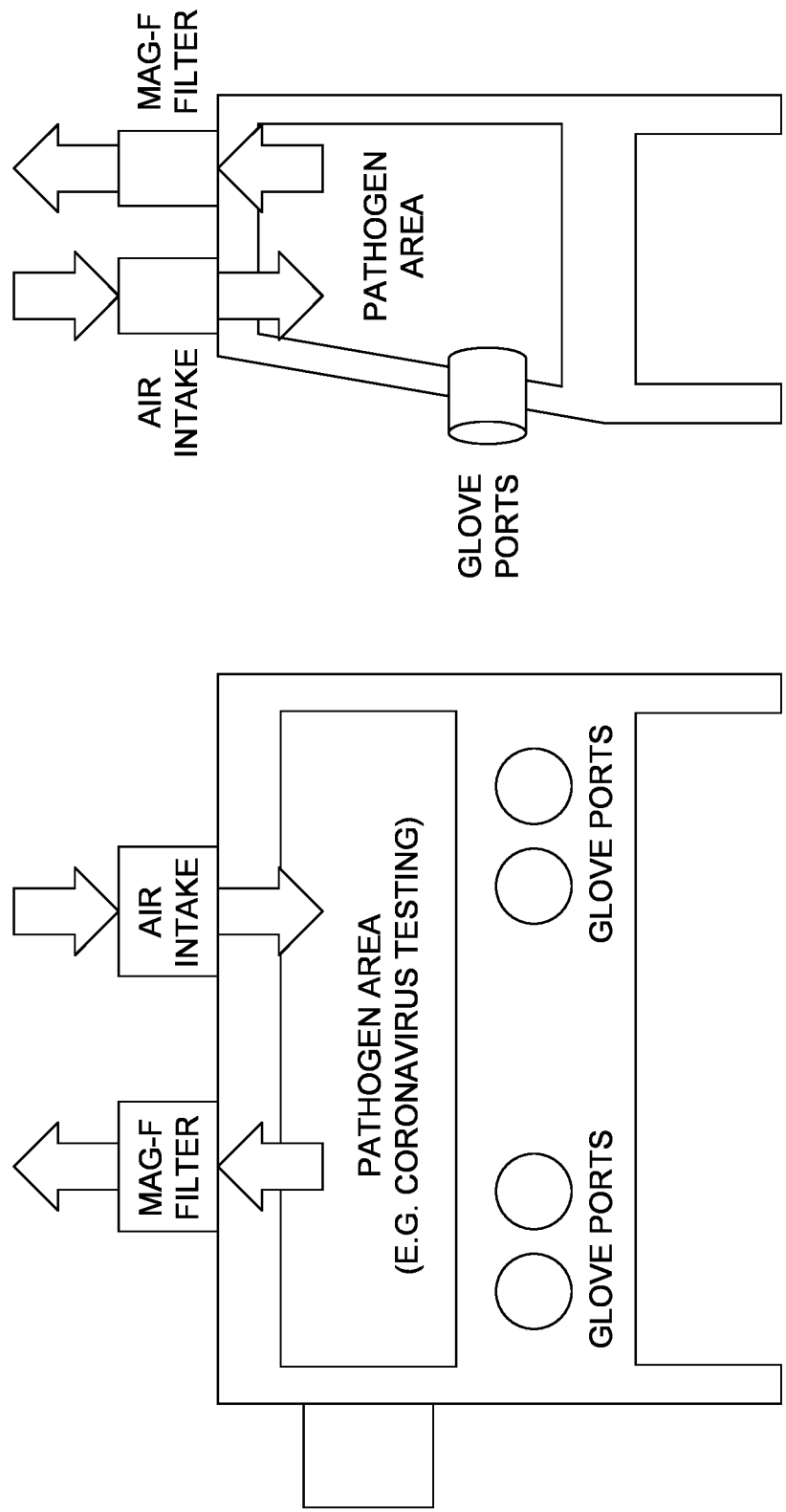
FIGS. 15A and 15B provide views of a pathogen removal system implemented in a containment system.
Figure 16:
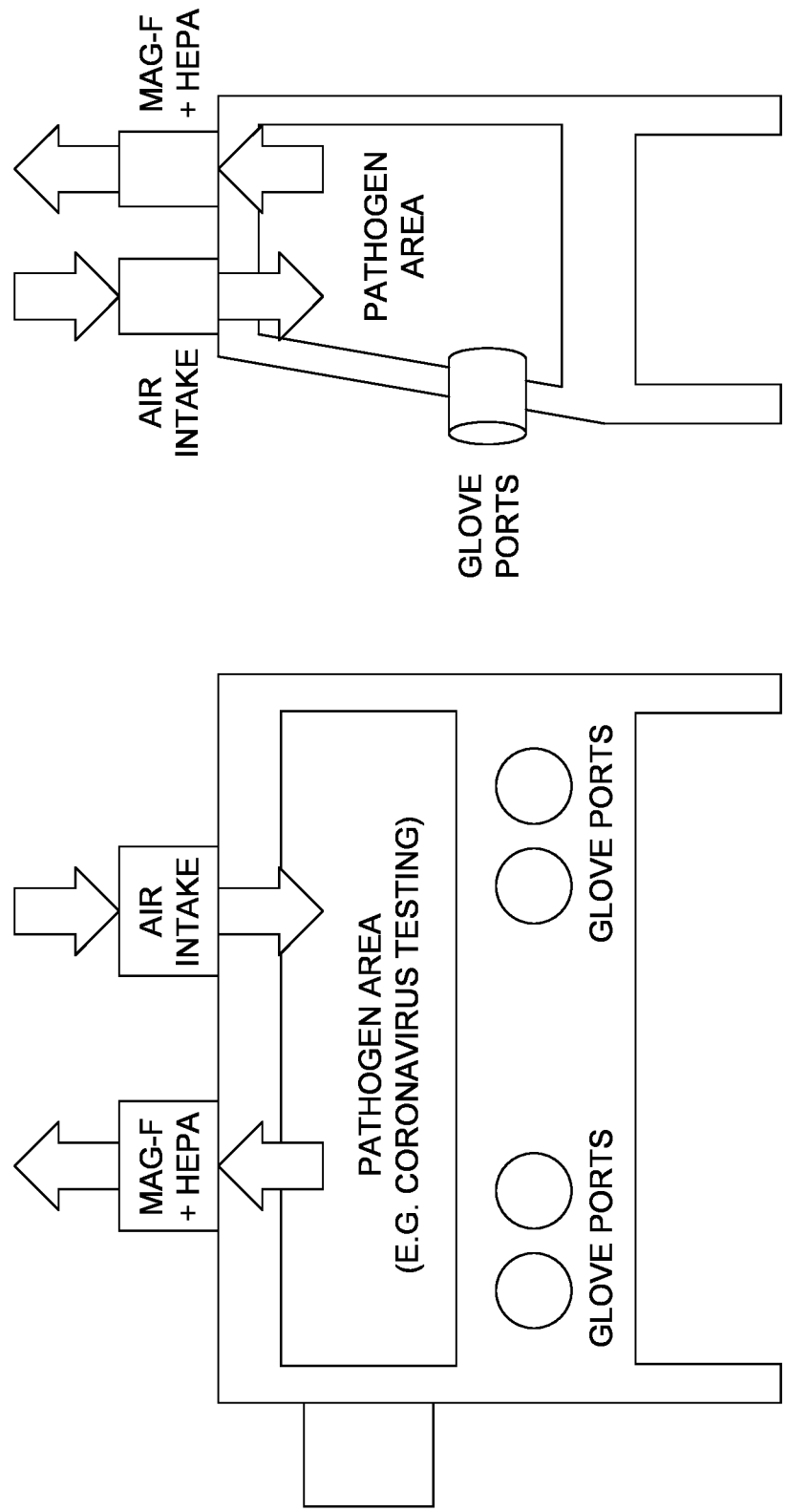
FIGS. 16A and 16B provide views of a pathogen removal system implemented in a containment system.

Referring to FIGS. 14 to 16, containment systems are another potential application for magnetic filters. An example of such a containment system would be a biohazard containment system. Biohazard containment systems are typically used in hospitals, clinics, laboratory services, research centres, and testing sites that have strict requirements on vent-out procedures when working with harmful pathogens. While these systems are self contained, they must exhaust air that has been in contact with pathogens to the atmosphere. Biohazard containment systems generally operate using air coming from the direct external environment (e.g., the room where the containment system is installed). The intake could also be fresh outdoor air. Biohazard containment systems circulate air from the external environment into a containment area followed by exhausting the air through a filtering system to purify the air. The air is passed through a filter and if the filter is a high grade HEPA filter, it will capture 99.97% of fine particles (0.3 microns and larger). However, the diameter of certain viruses (e.g. the new coronavirus SARS-CoV-2) is reported as 0.1 microns (μm). One assumption is that the new coronavirus is a droplet infection where the droplet size could be 0.5 micron, but this assumption may not always be the case.

FIGS. 14 to 16 show an example of biohazard containment system. Generally, air enters the building from the external environment through an air intake into a containment/pathogen area. The air is then exhausted through a HEPA filtering system into the atmosphere. FIG. 14 is a schematic for the air flow of a typical biohazard containment system, and is for illustrative purposes to provide a clear understanding of the concept. The magnetic filter could either replace or be combined with the HEPA filter system as shown in FIGS. 15 and 16. The magnetic filter could be integrated into the existing system to reduce the work required to implement the filter into existing systems like this and promote rapid adoption. In the case of combining the HEPA filter system with the magnetic filter, the solenoid system used for filtering could be designed to encapsulate the HEPA filter such that the HEPA filter would be embedded in the open core of the solenoid. The magnetic filter could facilitate prevention of harmful pathogens from entering the atmosphere. The power source for the magnetic filter could be the same as that used for the biohazard containment system, or a separate dedicated power source.

All systems can apply the magnetic filter system in more than one location to have enhanced purification and filtration. For example, in the HVAC systems, the recirculated air can be funneled through a second magnetic filter or existing magnetic filter to prevent pathogens that have entered a home or building from recirculating. In containment systems, an additional magnetic filter can be used at the air intake location to prevent external pathogens from entering. Magnetic filters can be provided at one or more intakes, one or more outlets and/or one or more intermediate sections of air flow conduits in various systems. It is also noted that the magnetic filters installed in a given system can be the same as each other, or they can be custom or specially designed for the given geometry or properties of specific parts of the air flow system.

Operation and Testing of the System

The configurations and operating conditions of the electromagnetic filtration system technology can be assessed by testing the filtering performance of a particular viral pathogen, e.g., SARS-CoV-2 or an inert sample thereof. The electromagnetic filtration system can be coupled to an air flow that has a known quantity of the viral pathogen added thereto, and the following variables can be assessed to determine operating envelopes for the system: current, area of the air core, length of solenoid, number of turns in the solenoid coil, air flow rate, air velocity, concentration of the pathogen in the air, properties of the pathogen of interest such as cell/viral particle mass, charge, and the like; among other variables. An RT-LAMP detection assembly, or other detection assemblies, can be used to detect the presence of the pathogen in the output air and/or in the air at different locations along the air flow path.

In terms of testing, known volumes of pathogens can be directed though the orifice of the negative end of the solenoid at a known air flow while the solenoid is active. The input air flow can be tested at various rates to determine efficacy and various magnetic field strengths can be used to test optimal field strength. An N99 tested at 0.1 microns material can be placed at the positive end of the solenoid to gather pathogens from the pathogen-contained air. After each test run, a swab of the full area of the material can then be used to measure the volume of the pathogen as well as used to in conjunction with RT-LAMP or similar device (e.g., PCR, qPCR) to test for the presence of the virus. In addition, different pathogens can be tested as well as different air properties (e.g., humidity) to assess the impact on magnetic filtration.

Additional Features and Components of the System

The electromagnetic filtration system can optionally be coupled to a fabric-based filtration component added to the air conduit to facilitate additional removal. The fabric component can be added upstream and/or downstream of the solenoid, for example, as a pre-treatment or a post-treatment stage. Fabrics can be added to the respirator and the requirements needed for fabrics to meet specifications can be reduced given that the viral and bacterial filtering is managed by electromagnetic filtering. This allows more flexibility in the types of fabrics that can be used allowing access to more readily available fabrics. As noted above, a HEPA filter unit can be combined with the electromagnetic filtration system, e.g., within the solenoid core or positioned upstream or downstream of the solenoid core or other magnetic filtration unit.

It is also noted that the electromagnetic component can be coupled to various other separation devices that can help filter or otherwise remove pathogens and/or other contaminants in the air flow (e.g., particulates, VOCs, and so on). The separation devices could remove or destroy the pathogens.

In addition, the solenoid inner casing could be coated with material that inactivates viruses and pathogens upon contact. The coating could be of various different materials that adhere to and/or deactivate the pathogens that come into contact with the coating. The filtration system could include an assembly for trapping or otherwise retaining or removing magnetically filtered or deflected viruses to discourage any entrainment of viruses with the air. This assembly could be coupled to another conduit that could be operated to remove retained viruses from the main conduit, and this additional conduit could be operated periodically or continuously. The filtration system could also include a deactivation assembly for deactivating magnetically filtered or deflected viruses.

Furthermore, the solenoid can be mounted in a fixed position to be static within the conduit as the air flows by or through. The solenoid could also be mounted and controlled to be displaceable in order to have certain effects, when desired (e.g., to move the solenoid into a different chamber or location).

Pathogen Examples

The electromagnetic filtration system can be configured and operated based on a target pathogen or series of target pathogens to be removed and/or based on certain features of pathogens (e.g., mass, charge, and so on). In one example, a target pathogen that is particularly problematic can be determined and the system can be provided to remove that target pathogen. For instance, the system can be designed for removing DNA and/or RNA viruses in general and coronaviruses in particular (e.g., SARS-CoV-2), and thus the design can be tailored based on the average mass of the viral particles, the average RNA content, the charge, and the like. The system can also be designed to account for potential viral mutations.

It is noted that various viruses can be considered in the context of designing the electromagnetic components of the system. For example, the system can be designed based on any virus of groups I to VII of the Baltimore classification system, including RNA and DNA viruses. The system can be designed based on the removal of multiple viruses such that a more difficult virus to remove is identified and the system is designed based on it to ensure removal of all viruses of interest.

Coronaviruses in general (and SARS-CoV-2 in particular) possess certain properties that may make them good candidates for electromagnetic filtration design. For example, the genomes of coronaviruses consist of single-stranded RNA about 26 to 32 kilobases in length, giving them the largest genomes amongst known RNA viruses. In particular, the genome sizes of SARS-CoV-2, MERS-CoV, and SARS-CoV have been reported to be about 29.9 kb, 30.1 kb and 27.9 kb, respectively. The mass and charge associated with such large genomes may be particularly exploitable in the context of the electromagnetic filtration implementations described herein. Additional properties of coronaviruses in general (and SARS-CoV-2 in particular) may be further exploitable for electromagnetic filtration including: virions which are pleomorphic spherical particles of about 75-160 nm in diameter and having a mass of approximately $1.6 \times 10^{-17}$ g with characteristic large, widely spaced, 12- to 24-nm-long spikes or peplomers that protrude from the virion; virus genome is a continuous linear single-stranded RNA, and the molecular weight is usually about $(5.5$ to $6.1) \times 10^6$ Daltons. In terms of water vapour (e.g., water droplet and/or aerosols) in which the virus may be comprised and transmitted: density of water is 997 kg/m$^3$; diameter of exhaled water vapor during normal breathing: 7.6 µm; volume of exhaled water (assume shape is sphere): 229.85 µm$^3$; surface area of exhaled water (assume shape is sphere): 181.46 µm; mass of exhaled water: about $2.3 \times 10^{-10}$ g. The electromagnetic filtration system can be designed based on water vapour (particularly virus-comprising aerosols) and coronavirus properties to provide for removal of the virus travelling via water droplets and/or aerosols in the air stream. SARS viruses (e.g., SARS-CoV or SARS-CoV-2) have been reported to remain viable on different media/surfaces for different lengths of time including up to 3 hours in aerosols, up to 24 hours on cardboard, and up to 2 to 3 days on hard, smooth surfaces such as plastic and steel, yet only up to 4 hours on copper (consistent with the reported anti-microbial properties of this metal). In some implementations, the choice and/or texture of the materials employed in the electromagnetic filtration systems described herein may be made to leverage the reduced stability of the viruses on particular surfaces, particularly on surfaces proximal to pathogen-attracting zones. Additionally, in some implementations, removable or replaceable diagnostic materials (e.g., strips or inserts) may be integrated into the electromagnetic filtration system proximal to the pathogen-attracting zones, which can then periodically be removed to assess the presence of the pathogens in the filtered air stream. Such removable or replaceable diagnostic materials can be later used in, for example, antibody- or PCR-based diagnostic testing. Alternatively, the generic presence of pathogens may be directly visible on the strip or insert via a color change on the strip or insert. Proteins, peptides, antibodies, or other pathogen-binding ligands (e.g., that non-specifically detect bacterial and/or viral glycans) may be levered in such diagnostic materials.

The electromagnetic filtration system can be designed based on a single target pathogen to provide efficient and effective removal from particular air streams of interest. The system can also be designed based on predetermined properties of certain air streams, e.g., humidity levels, pathogen concentrations, aerosol properties, and the like.

It is also noted that, in some implementations, the magnetic field used to filter the pathogens can also facilitate deactivation of the pathogens. For instance, a possible way to accomplish this would be to target the Larmor or precessional frequency of the virus around the magnetic field to heat and inactivate the virus. Special coatings could also be used on the attracting end of the solenoid to deactivate the virus upon contact. Ultraviolet light and/or heat can also be used to deactivate pathogens. FIG. 1 shows these various methods to inactivate the virus. Depending on the application, one or a combination of deactivation methods can be used. FIG. 1 is an image subset of FIG. 5 which illustrates the application in HVAC, Airplane recirculation, and containment systems.

While the implementations described and illustrated herein mainly focus on the use of a solenoid and the generation of a magnetic field for pathogen filtration, it is noted that other systems can be used to generate the magnetic field and other electromagnetic fields can be generated and used to prevent passage of pathogens in air streams. For example, non-limiting examples can include magnetically charged conductive fibers, electrically charged mesh filters, and electrically charged plates that are integrated in or proximate to the air conduit. A magnetic core of suitable size and shape could be used rather than an air core, e.g., for HVAC, airplane recirculation, and containment systems (as described herein). These systems could be retrofitted and would need suitable sizes and shapes to meet the functional system and air flow requirements. Alternative embodiments could rely on electric fields, combinations of electric and magnetic fields, or electromagnetic fields to achieve a filtering action.

The invention claimed is:

1. An electromagnetic air filtration system for removing SARS-CoV-2 virus from an air stream, comprising:
    an air conduit having an inlet, an intermediate section and an outlet, the inlet being configured to receive a contaminated air stream;
    a solenoid positioned with respect to the air conduit to provide a magnetic field in at least the intermediate section of the air conduit; and
    a power source coupled to the solenoid to provide a current therethrough to generate the magnetic field for preventing passage of the SARS-COV-2 virus in the air stream, thereby producing a treated air that is released via the outlet of the air conduit,
    wherein the solenoid comprises two opposed open ends, at least one of which receiving the air stream via the inlet, and the solenoid further comprises a side opening that communicates with the outlet of the air conduit and causes the air stream to flow out along a different direction compared to the air stream flowing into the solenoid.

2. The electromagnetic air filtration system of claim 1, wherein the air conduit is part of an HVAC assembly.

3. The electromagnetic air filtration system of claim 1, wherein the air conduit is part of a respirator assembly.

4. The electromagnetic air filtration system of claim 1, wherein the air conduit is part of an automobile air circulation assembly.

5. The electromagnetic air filtration system of claim 1, wherein the air conduit is cylindrical.

6. The electromagnetic air filtration system of claim 1, wherein the air conduit has a toroidal configuration.

7. The electromagnetic air filtration system of claim 1, wherein the solenoid comprises at least one coiled cable component and two connector components extending from opposed ends of the corresponding coiled cable component.

8. The electromagnetic air filtration system of claim 7, wherein the solenoid comprises one coiled cable component located around or defining at least a portion of the intermediate section.

9. The electromagnetic air filtration system of claim 7, wherein the solenoid comprises multiple coiled cable components located around at least a portion of the intermediate section in spaced apart relation to each other.

10. The electromagnetic air filtration system of claim 1, wherein the intermediate section is defined by an inner surface of the solenoid that defines an air core.

11. The electromagnetic air filtration system of claim 1, wherein the solenoid and the power supply are arranged and operated such that the electromagnetic field has a negative end toward the inlet and a positive end toward the outlet of the air conduit.

12. The electromagnetic air filtration system of claim 1, further comprising a deactivation component coupled to or proximate to the air conduit to deactivate the SARS-COV-2 virus.

13. The electromagnetic air filtration system of claim 12, wherein the deactivation component comprises a coating on an interior surface of the air conduit for direct contact with the SARS-COV-2 virus, a UV treatment unit, or a heating unit.

14. The electromagnetic air filtration system of claim 1, wherein the solenoid is positioned in-line and axially with respect to the air conduit such that the air stream flows therethrough.

15. The electromagnetic air filtration system of claim 1, comprising a flow deflection assembly for causing the flow of the air stream entering via the inlet to change direction such that the magnetic field acts on the SARS-COV-2 virus flowing with the air stream.

16. The electromagnetic air filtration system of claim 1, wherein the air conduit is part of an airplane air circulation assembly.

17. The electromagnetic air filtration system of claim 1, wherein the air conduit is part of a biohazard containment assembly.

18. An electromagnetic air filtration system for removing microscopic charged pathogens from an air stream, comprising:
    an air conduit having an inlet, an intermediate section and an outlet, the inlet being configured to receive a contaminated air stream; and
    an electromagnet arranged with respect to the intermediate section of the air conduit and configured to generate a magnetic field within the intermediate section of the air conduit for removing microscopic charged pathogens from the air stream, thereby producing a treated air that is released via the outlet of the air conduit;
    wherein the electromagnet comprises two opposed open ends, at least one of which receiving the air stream via the inlet, and the electromagnet further comprises a side opening that communicates with the outlet of the air conduit and causes the air stream to flow out along a different direction compared to the air stream flowing into the electromagnet.

19. The electromagnetic air filtration system of claim 18, wherein the electromagnet comprises a solenoid; and the solenoid is arranged around at least a portion of the intermediate section of the air conduit and such that the solenoid is configured to generate a magnetic field that establishes a pathogen-repelling zone toward the inlet and a pathogen-attracting zone toward the outlet of the air conduit.

20. The electromagnetic air filtration system of claim 18, further comprising a fabric filter component mounted in the air conduit.

* * * * *